United States Patent [19]

Wallace et al.

[11] Patent Number: 4,665,944
[45] Date of Patent: May 19, 1987

[54] ON-OFF DUMP VALVE

[75] Inventors: Gerald F. Wallace, Federal Way; Peter L. Madonna, Redmond, both of Wash.

[73] Assignee: Flow Industries, Inc., Kent, Wash.

[21] Appl. No.: 701,459

[22] Filed: Feb. 14, 1985

Related U.S. Application Data

[63] Continuation of Ser. No. 291,228, Aug. 10, 1981, abandoned.

[51] Int. Cl.⁴ ............................................. F16K 3/26
[52] U.S. Cl. .................................... 137/580; 137/861; 175/218; 239/124; 239/225.1; 277/27; 285/190
[58] Field of Search ................. 137/580, 861; 175/67, 175/218; 239/124, 127, 225, 237, 583; 277/3, 27, 119, 120, 121; 285/190, 113

[56] References Cited

U.S. PATENT DOCUMENTS

| 904,692 | 11/1908 | Greve et al. | 285/190 X |
| 932,060 | 8/1909 | Richards | 285/190 X |
| 3,147,015 | 9/1964 | Hanback | 285/190 X |
| 3,210,099 | 10/1965 | Franck | 285/190 |
| 3,492,025 | 1/1970 | Holland | 285/190 X |
| 3,627,355 | 12/1971 | Reddy | 285/190 X |
| 3,814,193 | 6/1974 | Schneider | 285/190 X |
| 4,099,673 | 7/1978 | Heath et al. | 239/583 X |
| 4,111,468 | 9/1978 | Schneider | 285/190 |
| 4,266,620 | 5/1981 | Wolgamott et al. | 137/580 X |
| 4,437,525 | 3/1984 | O'Hanlon et al. | 175/218 |

FOREIGN PATENT DOCUMENTS

| 75 | of 1926 | Australia | 285/190 |
| 1041914 | 10/1953 | France | 285/190 |
| 290400 | 5/1928 | United Kingdom | 285/190 |

Primary Examiner—Gerald A. Michalsky
Attorney, Agent, or Firm—Don R. Mollick

[57] ABSTRACT

This invention relates to a high pressure valve of the dump type. The valve body contains a slideable, hollow spool with ports connecting its interior and exterior. When the valve is in the on position, all ports are located in the pressurized portion of the valve body, and fluid flows to an outlet connected to the hollow spool. In the off position, at least one port is outside the pressurized area of the valve body, thereby relieving fluid pressure. The ports slide through a seal of self-pressurizing construction. The valve may also be used as a high pressure swivel, or combination valve swivel, by rotating the spool, if the spool is supported by bearings.

5 Claims, 3 Drawing Figures

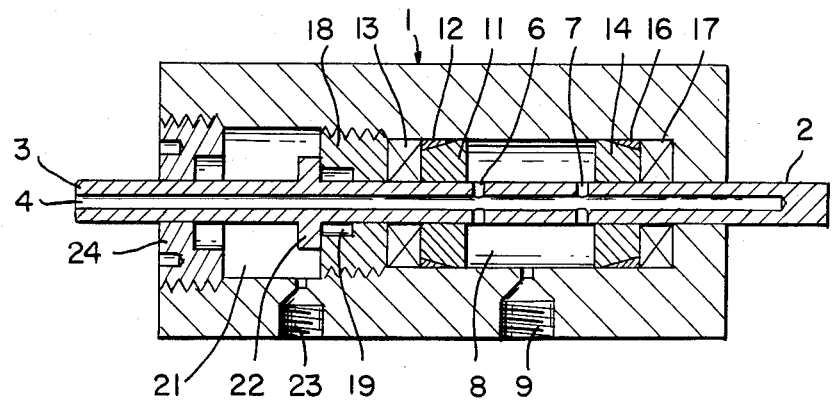
FIG. 1
FIG. 2
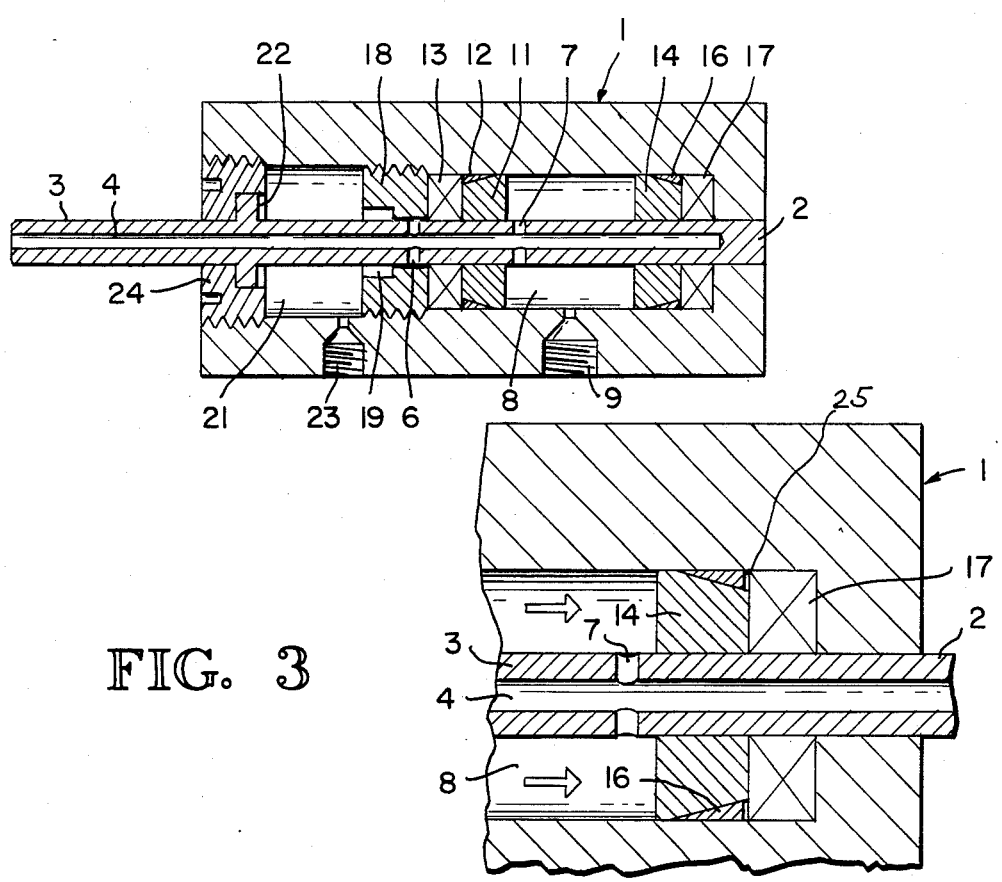
FIG. 3

ON-OFF DUMP VALVE

This application is a continuation of application Ser. No. 291,228, filed 08/10/81, now abandoned.

BACKGROUND OF THE INVENTION

1. Field of the Invention

This invention pertains to high pressure valves, particularly to high pressure valves which operate by directing flow to a dump outlet. With still greater particularity, this invention pertains to high pressure dump valves that are usable as a rotary joint.

2. Description of the Prior Art

Water jet cutting equipment requires the use of extremely high fluid pressures. Pressures in the range of 20,000–100,000 psi are not uncommon. At such pressures, conventional valves are useless, due to erosion at the seals, and, leakage. Accordingly, a number of valves have been devised which use the compression characteristics of materials at high pressures and counter balancing forces. Valves of this type, however, require high actuation forces to overcome the hydrostatic forces on the operating parts to actuate the valve. For this reason valves for high pressure use have required auxiliary activator systems, such as, solenoids or pneumatic activators to provide sufficient force to operate valves. Accordingly, a need has arose for a valve that may be constantly subjected to ultra high pressures, and requires a small actuation force.

Recent advances in high pressure technology have made water jet drilling of hard surfaces a reality. In such drilling, a high pressure jet at an angle to the surface face is rotated and advanced. A high pressure rotary joint is required for this device, to allow supply of high pressure fluid to the rotating jet. The joint is subjected to constant high pressure and movement. The swivel must still seal under these conditions.

In water jet drilling apparatus it is desirable that the assembly be as simple as possible. First, the simpler the apparatus is, the more lightweight, and, therefore, portable. Second, simplification of the apparatus reduces the chance of malfunctions, and increases durability. For these reasons it would be desirable to combine the functions of rotary joint and on-off valve in one piece of apparatus.

SUMMARY OF THE INVENTION

An improved high pressure valve is provided by the present invention. The device can be activated by a relatively low force such as could be provided by hand or foot force. The low activation force is needed even if the valve is operating at very high pressures. The valve is capable of substained operation at high pressures without leakage or scoring of the seal materials. These design ends are achieved by balancing of forces and the characteristics of materials under high pressures.

The device is comprised of a body suitable for containment of high pressures. The body has openings for entry and exit of fluids, and the activator. A valve spool is located within the valve body. The valve spool is hollow to equalize forces, and also acts as the activator. The valve spool is also provided with a series of ports that give access to the interior cavity. When the valve is in the on position, flow is through these ports and into the cavity which also serves as an exit in a load. When the valve is turned off, one set of ports are pushed through a seal into a second chamber in the valve body. The fluid now flows into the spool through one set of ports and out the other set. The other set of ports exit into a cavity connected to the outside, thus diverting pressure from the load. The valve is unusual in that ports having pressure on them pass through a seal. This is possible due to the high pressures which prevent seal materials from being eroded.

The device is also capable of operation as a high pressure rotary joint. Due to the symmetrical design of the device the valve spool may be rotated relative to the valve body. The ability to function as a rotary joint is also possible because the hydrostatic forces are balanced and no large forces are needed to produce movement. Combination of the valve and rotary joint functions results in simplicity of the apparatus and a savings in weight.

BRIEF DESCRIPTION OF THE DRAWINGS

FIG. 1 is a sectional plan view of the invention in the on position.

FIG. 2 is a sectional plan view of the invention in the off position.

FIG. 3 is a detail sectional view of the FIG. 1 embodiment.

DESCRIPTION OF THE PREFERRED EMBODIMENT

FIG. 1 is a sectional plan view of the invention in the on position. The device is generally cylindrical in shape, and, since this is a sectional view, it is realized that all rectangles are actually cylinders unless otherwise noted.

The outer surface of the invention is formed by the valve body 1 which in this embodiment is a cylinder, although it is realized that for other applications valve body 1 could be shaped otherwise. Valve body 1 is hollow to provide for valve cavities, and the passage of a spool 2. Spool 2 is an elongated member that is provided with a hollow core 4. One end 3 of cavity 4 serves as the outlet of the invention. Outlet 3 may be connected to a load, or may serve as an extention of the supply tube to a load. The load is not shown, but may be a cutting jet nozzle. The end of spool 2, opposite outlet 3, is sealed and acts as an activator for the invention. Spool 2 is provided with a first set of ports 6, and a second set of ports 7, which communicate between core 4 and the outer surface of spool 2. When the valve is in the on position, both ports 6 and 7 connect core 4 to the valve chamber 8 in valve body 1. Valve cavity 8 of the invention is connected to the outer surface of valve body 1 by the inlet passage 9, which may be a single hole. Inlet passage 9 is adapted to receive a high pressure connector, which along with a supply tube (not shown), connects inlet passage 9 to a source of ultra high pressure fluid, such as a pump or hydraulic intensifier. Valve cavity 8 is defined by the outer surface of spool 2, the inner surface of valve body 1, and two seals 11 and 14. Seals 11 and 14 may be comprised of a tapered seal plug combined with a back up ring 12, 16. If it is desired to operate the invention as a swivel, bearings 13 and 17 are provided. Bearings 13 and 17 may be constructed of a bearing material such as, bronze. For some applications it may be desirable to place a compression spring (not shown) between seal 11 and seal 14 to urge said seals outward, if the invention is used for intermittent service. Under normal conditions, cavity 8 is filled with high pressure fluid so no spring is necessary. The interior of valve body 1 is divided into two sections by the seal retainer 18. The first section already described is those components associated with valve cavity 8. The second section is the dump chamber 21. Seal retainer 18 is provided with a hole 19 allowing passage of spool 2. Hole 19 is of such dimension as to provide a small clearance between seal retainer 18 and spool 2. Dump chamber 21 is defined by the outer surface of spool 2, the inner surface of valve body 1, seal retainer 18, and the spool retainer 24. Spool retainer 24 closes the interior of valve body 1, and provides a hole for passage of spool 2. Spool 2 is provided with a flange 22, which limits the motion of spool 2, and retains spool 2 in valve body 1. Dump chamber 21 is connected to the outer surface of valve body 1 by the dump outlet passage 23, which may be a single hole. Dump outlet passage 23 may connect directly with the outside environment, or may receive a tube to connect it to an area, where it is desired to place excess fluid.

In the FIG. 1 position, high pressure fluid enters through a supply tube (not shown), connected to inlet 9. The fluid then flows through inlet 9 into valve chamber 8. In valve chamber 8 the difference between the pressure in valve chamber 8 and dump chamber 22 urges seal 11 toward bearing 13. In a similar manner, seal 14 is urged toward bearing 17. The only outlet from valve chamber 8 is ports 6 and 7 in spool 2. The fluid thus flows into core 4 in spool 2. Since spool 2 contains core 4, filled with very high pressure fluid, spool 2 is expanded in a direction away from its axis. This expansion forms a tight seal between the exterior of spool 2 and the interiors of seals 11 and 14, preventing any leakage out of chamber 8. Additionally when the seal is pressurized the taper of rings 12 & 16 forces seals 11 & 14 onto spool 2.

FIG. 2 is a sectional plan view of the FIG. 1 valve in the off or dump position. The parts are the same as in FIG. 1 and are identified by the same numbers. The position of ports are different as described below. As in FIG. 1, all parts are cylindrical except as noted.

In FIG. 2, spool 2 has been moved into the off or dump position. In this position it will be noted that the extension of core 4 is still surrounded by seals 11 and 14, and bearings 13 and 17. The second set of ports 7 is still in valve chamber 8, but has been moved toward seal 11. The first set of ports 6 has been moved to a position adjacent to seal retainer 18. Dump passage 19 is thus adjacent to the first set of ports 6. Dump passage 19 is formed by the clearance between the outer surface of spool 2 and the inner surface of seal retainer 18. Dump passage 19 is not to be confused with a hex key opening that forms part of passage 19, and is still visible in this view. Stop 22 has been moved into contact with a cavity in spool retainer 24. Spool 2 is thus at the limit of its travel toward the direction of spool retainer 24. In FIG. 1, stop 22 butted up against the surface of seal retainer 18 for the other limit of its movement.

In the FIG. 2 position, high pressure fluid enters by a supply tube (not shown) connected to inlet 9 as in FIG. 1. The fluid flows through inlet 9 to valve chamber 8. The same forces as in FIG. 1 are present in FIG. 2. From valve chamber 8 the fluid flows through the second set of ports 7 into core 4 in spool 2. The force in core 4 is still sufficent to operate seals 11 and 14. Next, the fluid flows through core 4 to the first set of ports 6. Since the pressure in dump cavity 21 is much lower than that in core 4, the fluid flows through the first set of ports 6 into passage 19. The clearance between seal retainer 18 and spool 2 is sufficient to accommodate this flow. At this point the fluid exits from passage 19 into dump chamber 21. The excess fluid is removed from dump chamber 21 via outlet 23. An outlet tube (not shown) may connect outlet 23 to a reservoir if it is desired to recycle the fluid.

It will be noted that in moving spool 2 from the FIG. 1 position to the FIG. 2 position, the first set of ports 6 must pass through seal 11 and bearing 13. As the first set of ports 6 contain fluid at high pressure, it would be expected that this passage would result in severe erosion of the interior of seal 11 and bearing 13. It has been found that at the high operating pressures of this valve that there is no erosion, even at pressures above 50,000 p.s.i. The explanation is believed to be that the high pressure fluid forces the material of seal 11 away from ports 6 and prevents the erosion. It will also be noted that the valve does not actually switch fluid from from outlet 3 to outlet 23 as a conventonal two-port valve, but rather acts by providing an alternative flow path that relieves the pressure. Due to the balanced construction of the valve, very little force is required to move spool 2 from the FIG. 1 to the FIG. 2 position. In fact, only sufficient force to overcome the friction between seals 11 and 17, and spool 2, need be applied. For this reason the valve may be operated by hand or foot pressure without the use of wheels, or other pressure increasing devices.

FIG. 3 is a sectional detail drawing that illustrates the operation of the seals of the invention. While FIG. 3 illustrates the area around seal 14, it will be realized that the area around seal 11 is similar and operates in the same manner. It will be noted that seal 14 is shaped like a hollow truncated cone with the base in contact with the high pressure fluid in valve chamber 8 and the top in contact with bearing 17. Seal 14 is constructed from a material that deforms and actually extrudes at a controlled rate under the influence of high pressure. It has been found that high molecular weight polyethylene is a suitable material for use in seal 14, but it is realized that other substances having similar properties may be substituted. The area between the tapered portion of seal 14 and valve body 1 is occupied by a back-up ring 16. Back-up ring 16 is constructed of a rigid material, such as stainless steel. Back-up ring 16 is shaped as a tapered annulus with a cylindrical outer surface and a conical inner surface. The taper of the inner surface of back-up ring 16 is chosen to match the taper of the outer surface of seal 14. It is crucial that the junction of the inner and outer surfaces of ring 16 form a sharp point. If the point is not sharp, back-up ring 16 will hang up on seal 14, and, impair the operation of the seal. It will also be noted, that a small gap 25 is formed between one end of back-up ring 16 and bearing 17. Gap 25 is also essential to operation of the seal. While the size of gap 25 must vary in different applications, it has been found that a suitable dimension for gap 25 in many applications is about 0.008 inches. The hole in the center of seal 14 is selected to conform closely to the outer diameter of spool 2.

In operation there is high pressure fluid in valve chamber 8 of the valve. As there is no fluid in the area of bearing 17, there is a large pressure differential between these two areas. This pressure differential produces a resultant force in the direction of the arrows in FIG. 3. The force pushes seal 14 toward bearing 17, but since seal 14 is tapered, the force is converted into a force that tends to increase the diameter of back-up ring 16. The expansion of ring 16 results in an increase of sealing force. The result is that the greater the pressure in valve cavity 8, the more effective the seal becomes. Since the sliding of seal 14, relative to back-up ring 16 is necessary to this operation, the importance of the sharp point on back-up ring 16 and gap 25 is readily appreciated. As was described above, the junction between the outer surface of spool 2 and the inner surface of seal 14 is sealed because the high pressure fluid present in core 4 expands the diameter of spool 2. This expansion is transferred into an outward force on valve body 1, which is constructed sufficiently strong to stake up the force. By use of this seal construction, continuous operation at pressures in excess of 50,000 pounds per square inch is possible. At pressures such as these, conventional hydraulic valves are useless, as the very distortion of materials that makes the operation of this valve possible, results in the destruction of the seals or jamming of moving parts.

The unique construction of the valve also allows use as a high pressure rotary joint. In a similar way, the device is usable as a combination on-off valve rotary joint. As is apparent in FIGS. 1 and 2, spool 2 is supported by bearings 13 and 17. The holes in retainers 24 and 18 are of sufficiently high clearance to allow rotation of spool 2 relative to valve body 1, even if core 4 of spool 2 is filled with high pressure fluid. As a result, it is possible to rotate spool 2 relative to valve body 1. In a water jet drilling application this may be accomplished by effectively connecting a motor to an extension of one end of spool 2 and a nozzle to the other end of spool 2. When the motor is started, the nozzle revolves, and high pressure fluid may be supplied to inlet 9 to ultimately emerge at the nozzle. For this application the use of a combination joint valve results in a great reduction of weight and simplification of the apparatus.

It will be understood that the invention may be embodied in other specific forms without departing from the spirit of the central characteristics thereof. The present examples and embodiments, therefore, are to be considered in all respects as illustrative and not restrictive, and the invention is not be to limited to the details thereof, but may be modified within the scope of the appended claims.

What is claimed is:

1. A high pressure valve having an on and an off position comprising:
   an inlet connectable to a source of high pressure fluid; and a valve body having a hollow interior connected to said inlet; and,
   a seal in said valve body dividing said valve body interior into a constant high pressure area connected to said inlet and a low pressure area connected to the outside environment; and,
   a hollow movable spool in said valve body including a hollow interior connected by at least two ports to the spool's exterior, the first port always connected to the area of constant high pressure in said valve body, and a second port connected to the area of constant high pressure when said valve is in the on position, and connected to the low pressure area when said valve is in the off position for dumping high pressure fluid from the interior of the spool; and,
   an outlet connected to the interior of said spool; and,
   rotation means attached to said spool for allowing 360° rotation of said spool relative to said valve body.

2. A high pressure valve having an on and an off position comprising:
   an inlet connectable to a source of high pressure fluid; and a valve body having a hollow interior connected to said inlet; and,
   a seal in said valve body dividing said valve body interior into a constant high pressure area connected to said inlet and a low pressure area connected to the outside environment; and,
   a hollow movable spool in said valve body including a hollow interior connected by at least two ports to the spool's exterior, the first port always connected to the area of constant high pressure in said valve body, and a second port connected to the area of constant high pressure when said valve is in the on position, and connected to the low pressure area when said valve is in the off position for dumping high pressure fluid from the interior of the spool; and,
   an outlet connected to the interior of said spool; and,
   flexible seal means for forming a seal; and,
   force conversion means for connecting the pressure differential between the high pressure area of said valve body and the outside environment into a sealing force.

3. A valve as in claim 2 wherein, said flexible seal means is a tapered annulus of material deformable at high pressures.

4. A valve as in claim 3 wherein, said force conversion means is in a tapered annulus of metal with a taper equal to that of said flexible means.

5. A high pressure valve having an on and an off position comprising:
   an inlet connectable to a source of high pressure fluid; and,
   a valve body having a hollow interior connected to said inlet; and,
   a seal in said valve body dividing said valve body interior into a constant high pressure area connected to said inlet and a low pressure area connected to the outside environment; and,
   a hollow movable spool in said valve body including a hollow interior connected by at least two ports to the spool's exterior, the first port always connected to the area of constant high pressure in said valve body, and a second port connected to the area of constant high pressure when said valve is in the on position, and connected to the low pressure area when said valve is in the off position for dumping high pressure fluid from the interior of the spool; and,
   a first sealing surface for sealing to said spool; and,
   a second sealing surface for sealing to the interior of said valve body; and,
   force conversion means for converting the force pressure differential between the high pressure area of said valve body and the outside environment into a resultant force urging said first sealing surface onto said spool, and said second sealing surface onto said valve body.

* * * * *